April 30, 1968     A. DI TOMMASO ET AL     3,380,310
STABILIZATION SYSTEM
Filed June 2, 1964     2 Sheets-Sheet 1
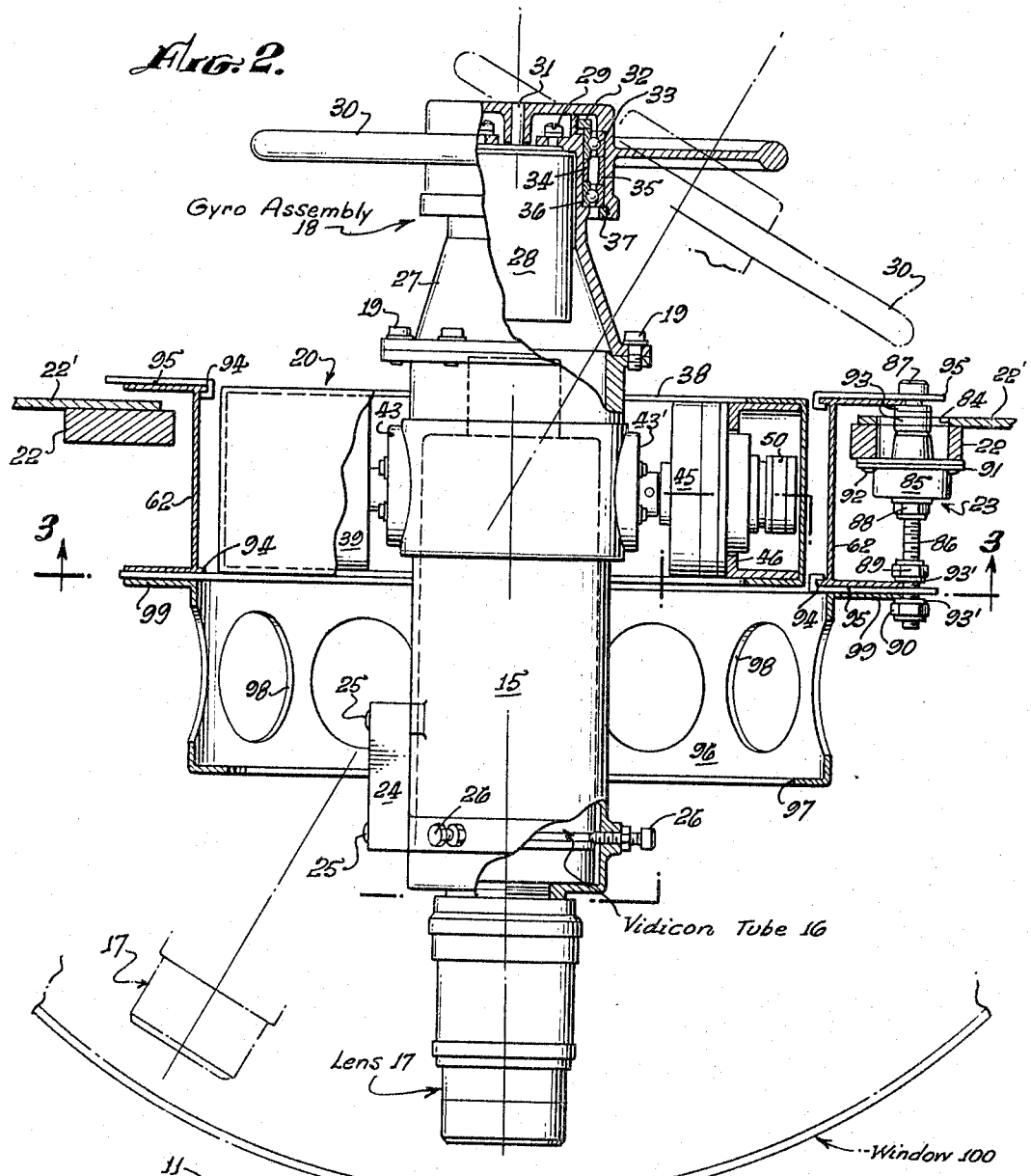
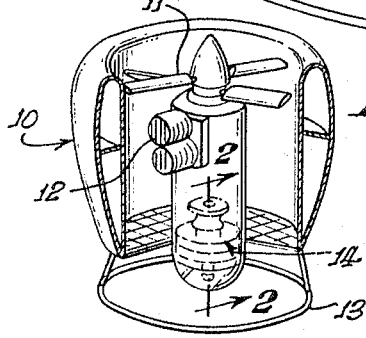
DANIEL CHESTER McKOWN,
WALTER CARL MARTIN,
ANTHONY DI TOMMASO,
INVENTORS.
BY
ATTORNEY.

DANIEL CHESTER McKOWN,
WALTER CARL MARTIN,
ANTHONY DI TOMMASO,
INVENTORS.

BY *John N. Hazelwood*

ATTORNEY.

3,380,310
STABILIZATION SYSTEM
Anthony Di Tommaso, Montclair, Walter C. Martin, Glendora, and Daniel C. McKown, Chino, Calif., assignors to General Dynamics Corporation, Pomona, Calif., a corporation of Delaware
Filed June 2, 1964, Ser. No. 371,990
21 Claims. (Cl. 74—5.22)

This invention relates to surveillance equipment, particularly to surveillance equipment supporting devices, and more particularly to a surveillance equipment stabilization system utilizing a gimbal supporting mechanism and which is gyroscopically controlled, and having utility, for example, in an aircraft.

Aerial surveillance has proven an effective manner to view areas quickly and at various time intervals. However, the expense of the present known surveillance systems becomes prohibitive for many needed applications such as tactical reconnaissance for the military, civil defense applications and fire detection and fighting applications.

One of the problems of aerial surveillance is to develop support and stabilization equipment that has great accuracy and uniformity and can be used with various types of cameras. Due to the vibrations caused by the surveillance equipment carrier, it is necessary to develop means for stabilizing the camera against these vibrations and to maintain it in a predetermined plane irrespective of the position occupied by the carrier vehicle.

Therefore, it is an object of this invention to provide a gyroscopically controlled camera support whereby aerial surveillance can be carried out with greater accuracy and uniformity than currently possible with known equipment.

A further object of the invention is to provide a mobile, gyroscopically stabilized, camera support that will maintain a camera supported thereon in a predetermined plane irrespective of the position occupied by the carrier vehicle.

Another object of the invention is to provide an aerial camera support capable of maintaining the camera constantly in a perpendicular position irrespective of the ever changing positions of the carrier vehicle which is subject to the action of air currents, and other factors, which prevent the carrier from moving in a level plane.

Another object of the invention is to provide a camera support in which is embodied salient features of construction designed to minimize vibration and shock which may be transmitted to the camera by the movements of the supporting vehicle.

Another object of the invention is to provide a camera stabilization system which is gimbaled, shock mounted, and gyro stabilized.

Other objects of the invention, not specifically set forth above, will become readily apparent from the following description and accompanying drawings wherein:

FIG. 1 is a perspective view of a carrier vehicle having a portion thereof cut away to show the location of the invention;

FIG. 2 is a view partially in cross section of an embodiment of the invention taken on the line 2—2 of FIG. 1;

Figure 3:
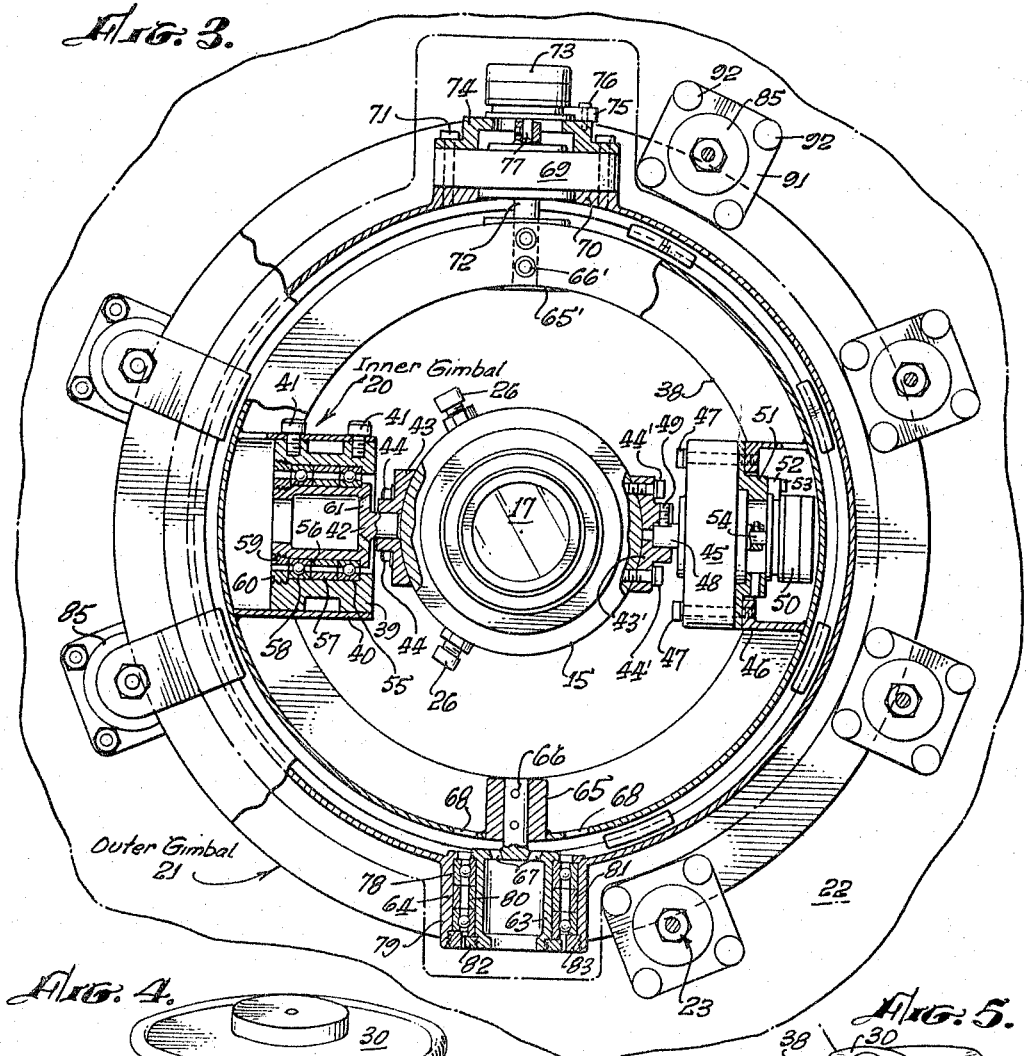
FIG. 3 is a view taken on the line 3—3 of FIG. 2 with portions thereof being cut away.

This invention relates to a system for gyroscopically stabilizing a camera, such as a TV camera, which is mounted on an object or vehicle subject to severe motions of vibration or acceleration. The vidicon tube support also carries the gyro assembly for direct stabilization and this subassembly is gimbal mounted for two degrees of freedom, restricted in extent to approximately a 30° cone by a look-angle limiting device mounted on the outer gimbal ring. Other significant features include: (1) an inner gimbal torquer located between the ring and the vidicon-gyro subassembly, (2) a gyro having the rotor and bearings radially located outside of and concentric to the spin motor, and (3) a shock mounting arrangement designed for attachment to the outer gimbal ring so as to permit adjustment for optimum vibration isolation and adjustment of the system's center of gravity. There are three control modes (manual control, control with respect to vehicle, and control with respect to space or inertial reference) for positioning the vidicon tube.

The stabilization system of the invention consists generally of an outer gimbal ring and shock mount assembly, an inner gimbal ring assembly, a vidicon support tube, and a gyro assembly, each gimbal being equipped with a torque motor and a position pickoff potentiometer.

The invention is particularly applicable in and will be described with respect to a stabilization system for stabilizing a television camera tube and lens for a low altitude observation system wherein it meets the requirement of maintaining the television line-of-sight in a steady, vertical orientation independent of the motion of the airframe. Motion of the airframe is limited to —30 degrees from the local vertical in pitch and roll; angular rates about these axes could approach 100 degrees per second.

The mass to be stabilized is mounted in a two-axis gimbal system whose axes are perpendicular and intersect at the center of gravity of the stabilized mass and gimbal system. This approach results in a stable element that will not rotate when subjected to linear accelerations in any direction since no torque is generated with the center of mass at the pivot. The gimbals are each equipped with a torque motor and position pickoff. The output of the position pickoffs are summed with those of corresponding gimbals of the vertical gyro (which are aligned with those of the vidicon stabilization system). The algebraic sum of each of the vidicon gimbal pickoffs and its corresponding vertical gyro axis pickoff is then used as an error signal which is amplified and applied to the respective gimbal torquer to rotate the vidicon platform in such a manner as to make the sum zero. When both sums are zero, the vidicon line-of-sight is parallel with the local vertical as seen by the vertical gyro. A relatively large stabilizing gyro is physically mounted to the stabilized mass. As mentioned earlier, angular position of the stable platform is not affected by linear accelerations of the vehicle. Angular motion of the vehicle also has no effect upon the line-of-sight because the vidicon is mounted in the two axis gimbal system and only small torques transmitted through the gimbal bearings tend to rotate the line-of-sight. These small torques have very little effect upon the angular orientation of the stabilizing gyro mounted on the stable platform and result in extremely slow precession rates of the gyro and vidicon line-of-sight. With the feedback control system in operation these small precession rates will be reduced to zero by action of the individual torque motors cancelling out the torques transmitted through the gimbal bearings. This approach allows use of a fairly simple, low response (loose), servo loop. Also, because the error signals and, thus, the voltages applied to the torque motors are proportional to the degree of misalignment between the stable element and the vertical gyro, precession speed in correcting error is also proportional to the degree of error. Therefore, angular error is "closed out" from one side as in a highly damped servo loop even though it is actually quite loose.

Maximum precession rate of the gimbals in this embodiment is approximately 5 degrees per second. This is not to be confused with allowable airframe angular rates, but simply describes the maximum rate that misalignments between the vertical gyro and the line-of-sight of the vidicon may be corrected independent of the motion of the airframe.

In order to cope with the vibration problem, the enstabilization system is shock mounted, and in this embodiment, upon eight omnidirectional shock mounts. These mounts allow airframe vibrations with amplitudes of up to 3/16" with respect to the stabilization system in any direction. The use of eight mounts in this embodiment was experimentally shown to provide adequate isolation from the vibration environment. The suspension has a low natural frequency to prevent being excited by vibration of the vehicle. A high natural frequency was chosen for the individual components of the stabilization system (rather than a low frequency) in order to provide adequate stiffness and eliminate the problem of large deflections that could cause unbalance torques in the gimbals. As shown, provision is included in the structure for changing the number, size, and positions of the shock mounts which will allow tailoring of the system to meet a variety of vehicle vibrational modes.

Referring now to the drawings, FIG. 1 shows an air vehicle 10 propelled by a contra-rotating propeller 11 which is driven by a gasoline engine 12, and supported on a tubular platform 13. The camera and stabilizing system therefor are indicated generally at 14 and shown in detail in FIGS. 2–4.

The camera and stabilizing system 14 comprises a vidicon tube support 15 having a vidicon tube (television pick-up) 16 mounted therein, a lens 17 screwed onto one end of tube support 15, a gyro assembly generally indicated at 18 attached to the other end of tube support 15 by bolts 19, and an inner gimbal assembly and an outer gimbal assembly indicated at 20 and 21, respectively. Said outer gimbal assembly is attached to a mounting plate 22 through a plurality of shock mounts 23, mounting plate 22 being fixedly attached to the frame of vehicle 10 via support structure 22'. A preamplifier 24 is attached to tube support 15 at the end adjacent lens 17 by an attaching means such as screws 25. Vidicon tube 16 is positioned within tube support 15 by a plurality of set screws 26 at the forward and aft end thereof.

Gyro assembly 18 comprises a support or housing 27 which is fixed to tube support 15 by bolts 19, a spin motor 28 fixed within housing 27 by bolts or screws 29, and a gyro 30 rotatably mounted on housing 27 through a bearing assembly and drivingly connected to spin motor 28 by drive 31. The bearing assembly for gyro 30 consists of an inner bearing retainer 32, a ball type bearing 33, inner and outer bearing spacers 34 and 35, respectively, a second ball type bearing 36, and an outer bearing retainer 37, as shown in FIG. 2.

Inner gimbal assembly 20 (see FIG. 3) comprises a ring 38 which is hollow and of rectangular cross section; a counter weight sleeve 39 attached to a housing 40 by bolts 41, housing 40 being fixed to ring 38 by any conventional means such as welding; an axle 42 rotatably positioned within counter weight sleeve 39 through a preloaded bearing assembly and fixedly attached to tube support 15 through a mounting 43 attached to support 15 via bolts 44; a torque motor 45 attached to ring 38 through a housing 46 by bolts 47. Housing 46 is fixedly attached to ring 38 as by welding, torque motor 45 having a shaft 48 which is fixed to a mounting 43' by means such as set screw 49, mounting 43' being fixed to support 15 via bolts 44'; and a position pickoff such as potentiometer 50 operatively mounted on torque motor 45 via a mounting plate 51 and lugs 52 by bolts 53 and drivingly connected to torque motor 45 via a shaft and set screw arrangement indicated at 54. The preloaded bearing assembly between counter weight sleeve 39 and axle 42 comprises a ball type bearing 55, inner and outer bearing spacers 56 and 57, respectively, a second ball type bearing 58, and inner and outer retaining nuts 59 and 60, respectively threaded onto axle 42 and counter weight sleeve 39. Axle 42 is provided with a plurality of apertures 61 through which wiring extends as described hereinafter. Potentiometer 50 is of the linear type and measures the angular position of the vidicon tube support 15 with respect to the inner gimbal ring 38.

Outer gimbal assembly 21 comprises a ring 62 having a generally U-shaped cross section (see FIG. 2); an axle 63 rotatably positioned within a housing 64 through a preloaded bearing assembly and fixedly attached to inner gimbal ring 38 through a mounting 65 by bolts or screws 66. Mounting 65 is attached to ring 38 by means such as welding, with housing 64 being made integral with or attached to ring 62 such as by welding, axle 63 being provided with a plurality of apertures 67 through which wiring extends into inner gimbal ring 38 via apertures 68 therein (see FIG. 3). A torque motor 69 is attached to ring 62 through a housing 70 by bolts 71, housing 70 being integral with or attached to ring 62, torque motor 69 having a shaft 72 which is fixed to a mounting 65' by means such as bolts or screws 66', mounting 65' being attached to ring 38 by conventional means such as welding; and a position pickoff such as potentiometer 73 mounted on torque motor 69 via a mounting plate 74 and lugs 75 by bolts 76 and drivingly connected to torque motor 69 via a shaft and set screw arrangement indicated at 77. The preloaded bearing assembly between axle 63 and housing 64 is similar to the inner gimbal bearing assembly and comprises a pair of ball type bearings 78 and 79 separated by inner and outer spacers 80 and 81, and preloaded by inner and outer retaining nuts 82 and 83 which are respectively threaded onto axle 63 and housing 64. Potentiometer 73 is also of the linear type and measures the angular position of the inner gimbal ring 38 with respect to the outer gimbal ring 62.

Mounting plate 22 and support structure 22' of vehicle 10 are provided with a plurality of apertures 84 within which shock mounts 23 operate, there being eight (8) shock mounts 23 in this embodiment but extra apertures 84 are provided so that the number of mounts required may be added to or taken from the instant showing.

Figure 4:
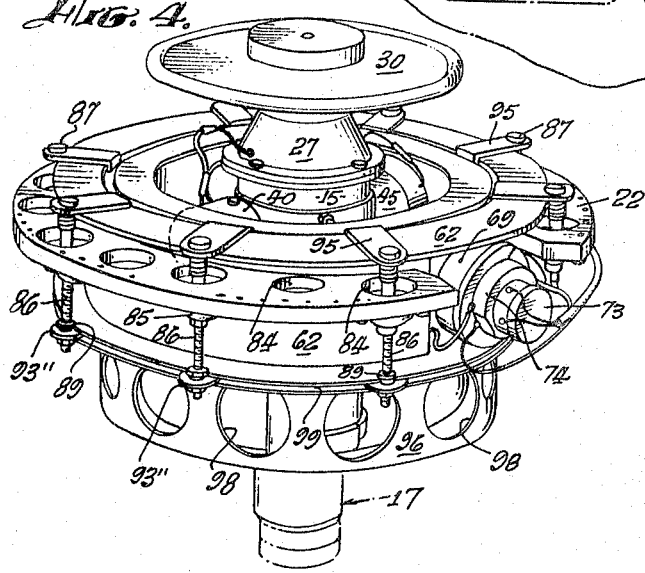
FIG. 4 is a perspective view of the embodiment shown in FIGS. 2 and 3.

Shock mounts 23 each comprises a rubberized body portion 85, a rod 86 extending through body 85 and connected thereto which is threaded at both ends to receive nuts 87, 88, 89 and 90, said body 85 having a flange which is held against plate 22 by a retainer ring 91 and screws 92; and a plurality of spacers 93 and washers 93'. Spacer washers 93" may be positioned between ring 62 and limiter 96 as shown in FIG. 4.

Outer gimbal ring 62 is provided with a pair of flanges 94 upon which mounting clips 95 hook, clips 95 each being provided with an aperture at the end opposite the hook portion thereof and through which extends a rod 86 of shock mount 23.

A look angle limiter 96 is positioned around the lower end of tube support 15 and is provided with an aperture 97 to allow the lens 17 to move 30 degrees in any direction from the solid line position as shown in phantom in FIG. 2. Limiter 96 is provided with a plurality of apertures 98 to reduce the weight thereof and a plurality of apertures in a flange portion 99 through which rods 86 of shock mount 23 extend. Limiter 96 provides a positive stop for lens 17.

As shown in FIG. 2, the camera and stabilizing system 14 and look angle limiter 96 are attached to mounting plate 22 via shock mount 23 wherein retainer ring 91 holds shock mount body 85 against mounting plate 22 by screws 92. The upper end of rod 86 extends from body 85 through spacers 93 and mounting clip 95 and held in place by nut 87, while the lower end of rod 86 extends from body 85 through nut 88, nut 89, washer 93', mounting clip 95, washer 93' and nut 90, wherein nuts 88 and 89 are adjusted to determine the tension on body 85 while nut 90 holds limiter 96 and clip 95 against outer gimbal ring 62.

A window 100 (partially shown in FIG. 2) is positioned below the camera and stabilizing system 14 to prevent contamination of the system.

Figure 5:
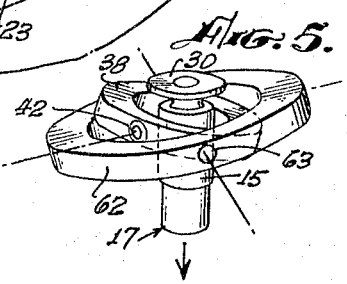
FIG. 5 is a schematic view illustrating the gimbal mounting of the invention.

It is thus clear that the camera and stabilizing system 14 is mounted in a gimbal system so as to permit rotation about two mutually transverse axes, as shown schematically in FIG. 5. The line of sight of lens 17 may move ±30 degrees in any direction as shown in FIG. 2 thus allowing the lens 17 to be vertically positioned with respect to the horizontal during practically all positions of the carrier vehicle 10.

All the wiring for the signal and power assemblies extend through the apertures 61 and 67 in the gimbal axes 42 and 63, respectively, and through apertures 68 and the hollow space within inner gimbal ring 38, thereby eliminating the need of slip rings, thus reducing electrical noise and increasing the reliability of the system 14 by reducing environmental effects.

The camera and stabilizing system 14 will operate when mounted on various types of vehicles, including but not limited to: guided missiles, aircraft, helicopters, drone helicopters, blimps, automobiles and trucks, tanks, boats, and submarines. The system keeps the line-of-sight of the camera from rotating or vibrating angularly with respect to inertial space. The disclosed system has been tested under simulated vehicle vibrations from 0 to 200 c.p.s., with levels of 5 G from 50 to 200 c.p.s.; there being no visible drift or angular vibration of the line-of-sight.

The natural frequency of vibration of the disclosed embodiment of the camera stabilization system is ten cycles per second when mounted as shown in eight shock mounts. Because this natural frequency is low, the gimbals and camera will show very little response to vibrations of the carrier vehicle 10 in the range of 30 to 300 c.p.s., such vibrations being caused by the rotating components of the vehicle, such as the crankshaft, propeller, or wheels. This isolation against high frequency vibrations reduces the severity of resonant frequencies in the gimbal assemblies 20 and 21 and associated structure, of vibration effects on the gyro assembly 18, and of vibration effects on the vidicon tube 16 and its preamplifier 24. By gimbal mounting the camera and gyro stabilizing it as shown and described, low frequency vibrations in the range of 0 to 30 c.p.s. are prevented from rotating the line-of-sight; such low frequency movements may be caused by maneuvering of the vehicle 10 or by turbulent environmental effects on the vehicle. To obtain a low natural frequency, the deflection of the shock mounts 23 is relatively large compared to other deflections in the system 14. As a result, pendulous effects would cause severe gyro drift during vehicle accelerations, were it not for the fact that the center of gravity of the system 14 is designed to lie in the plane of the shock mounts 23.

As stated above, there are three basic modes of operation for controlling the direction the camera is pointing within the permissible look angles, these being manual control, control with respect to the vehicle, and control with respect to inertial reference, a brief discussion of each of these modes follows:

*Manual controls.*—In this mode, an operator observes the television picture which is being received and based on what he sees, he transmits signals to activate the torquers, precessing the line-of-sight. The linear potentiometers 50 and 73 are not required for this mode.

*Control with respect to vehicle.*—In this mode, a servo system is used to activate the torquers in such a way as to maintain the resistance of the linear potentiometers at a constant value. This maintains the line-of-sight at a constant angle with respect to the vehicle.

*Control with respect to inertial reference.*—In this mode, an inertial reference is carried on board the vehicle.

The pickoffs on the inertial reference indicate the attitude of the inertial reference with respect to the vehicle. The linear potentiometers on the camera stabilization system indicate the attitude of the line-of-sight with respect to the vehicle. A servo system is used to precess the vidicon stabilization gyro until the angles indicated by the linear potentiometers equal the angles indicated by the inertial reference pickoffs. The inertial reference can be either a directional gyro or a vertical gyro (not shown).

While the stabilizing system has been described with respect to a vidicon tube and its preamplifier, it can be used as effectively for stabilizing a photographic camera or infrared detectors. Each of these types of surveillance systems can be effectively mounted in unmanned and remote vehicles such as space satellites, moon explorer vehicles, and vehicles for use in hazardous environments such as radioactivity, poison gas, etc.

It has thus been shown that this invention provides a stabilization system for cameras or the like which may incorporate all or certain of the following advantages: (1) a stabilization gyro attached physically to the vidicon tube for providing direct stabilization; (2) a torquer on the inner gimbal mounted close to the vidicon instead of at the radius of the gimbal ring to reduce the moment of inertia about the outer gimbal axis and thus to increase the nutation frequency of the gyro stabilized mass; (3) utilizes a hollow tube structure for the inner gimbal ring to save weight and at the same time maintain a high resonant frequency; (4) a gyro subassembly which is readily detachable for ease of maintenance; (5) all signals and power are brought through the gimbals by use of wires instead of slip rings, thus reducing electrical noise and increasing reliability by reducing environmental effects; (6) a method of attaching the shock mounts to the outer gimbal ring which permits adjustment of the shock mount circumferentially along the outer gimbal ring to provide optimum isolation for various environments and permits adjustment of the center of gravity of the shock mounted system to lie in the plane of the shock mounts; (7) a gyro having preloaded bearings and rotor positioned radially outside of and concentric to the gyro motor; (8) a special shaped outer gimbal ring which saves weight, maintains a high resonant frequency for the outer ring, and facilitates attachment of the shock mounts; (9) a look angle limiter which limits the maximum deviation of the line-of-sight in any direction to ±30 degrees from a line perpendicular to the plane of the shock mounts; and (10) a structure which achieves the required stiffness while keeping the weight to a minimum.

Although a particular embodiment of the invention has been illustrated an described, modifications will be readily apparent to those skilled in the art, and it is intended to cover in the appended claims all such modifications as come within the true spirit and scope of the invention.

What we claim is:

1. In a camera carriage for air vehicles the combination with a main supporting member adapted to be rigidly attached to an airframe of an air vehicle; a first gimbal assembly operatively connected to said supporting member through a plurality of shock mount means, a second gimbal assembly operatively connected to said first gimbal assembly, camera supporting means operatively connected to said second gimbal assembly, and a gyro means operatively mounted on one end of said camera support means such that the gyro means longitudinal axis is aligned with the camera supporting means longitudinal axis.

2. The apparatus defined in claim 1, wherein said first gimbal assembly includes a ring member, an axle means rotatably mounted on said ring member, and torquer means operatively connected to said ring member.

3. The apparatus defined in claim 2, wherein said ring member is of U-shaped cross-sectional configuration.

4. The apparatus defined in claim 2, wherein said first gimbal assembly additionally includes a potentiometer operatively connected to said torquer means.

5. The apparatus defined in claim 1, wherein said second gimbal assembly includes a ring member, an axle means rotatably positioned on said ring member, and torquer means operatively connected to said ring member.

6. The apparatus defined in claim 5, wherein said ring member is hollow and of rectangular cross-sectional configuration.

7. The apparatus defined in claim 5, wherein said second gimbal assembly additionally includes a potentiometer operatively connected to said torquer means.

8. In combination: a vehicle, means operatively connected for propelling said vehicle, a camera operatively positioned with respect to said vehicle, means for supporting said camera, gyro means attached to said camera supporting means at one end thereof and in axial alignment therewith, an inner gimbal assembly operatively connected to said camera supporting means, an outer gimbal assembly operatively connected to said inner gimbal assembly, and shock mounting means operatively connecting said outer gimbal assembly to said vehicle.

9. The combination defined in claim 8, wherein said inner and outer gimbal assemblies each include torque motor means and position pick-off potentiometer means.

10. The combination defined in claim 8, wherein said gyro means includes a spin motor, a preloaded bearing assembly and rotor means positioned radially outside of and concentric to said motor, said rotor means being drivingly connected to said spin motor.

11. A stabilization mechanism comprising: a support assembly adapted to hold a device to be stabilized, gyro means for said support assembly mounted at one end of said support assembly and axially aligned therewith, a first gimbal assembly operatively connected to said support assembly, a second gimbal assembly operatively connected to said first gimbal assembly, and a plurality of shock mounts operatively connected to said second gimbal assembly and adapted to be connected to a supporting mechanism, said second gimbal assembly having an axis transverse to the axis of said first gimbal assembly, each of said gimbal assemblies including a torquer means.

12. The stabilization mechanism defined in claim 11 including a position pick-off means operatively connected to said torquer means, said position pick-off means functioning to measure the angular position of said support assembly with respect to a ring member of the associated gimbal assembly.

13. The stabilization mechanism defined in claim 12, wherein the ring member of said first gimbal assembly is hollow and of a rectangular cross-sectional configuration.

14. The stabilization mechanism defined in claim 11, wherein each of said gimbal assemblies includes a ring means and an axle means rotatably mounted on said ring means, one of said ring means being hollow and of a rectangular cross sectional configuration, the other of said ring means being of a U-shaped configuration, each of said axle means being provided with apertures therethrough, whereby said gimbal assemblies provide passageways through which signal and power wiring for the stabilization mechanism may pass.

15. The stabilization mechanism defined in claim 11, wherein said plurality of shock mounts are adjustable.

16. The stabilization mechanism defined in claim 11, wherein said gyro means includes a motor means and a rotor means, said rotor means being mounted radially outside of and concentric to said motor means through a preloaded bearing assembly.

17. A stabilization system for a camera or the like comprising: a camera supporting mechanism; gyro means for said camera supporting mechanism, said gyro means including a housing, a spin motor positioned in said housing and attached thereto, a rotor member mounted on said housing through a preloaded bearing assembly and drivingly connected to said spin motor, said rotor member and bearing assembly being radially outside of and concentric to said spin motor; an inner gimbal assembly including a hollow ring member, an axle member operatively mounted on said ring member through a preloaded bearing assembly, said axle member having a portion thereof operatively connected to said camera supporting mechanism, a torque motor operatively mounted on said ring member and coaxial with said axle member, said torque motor being connected to said camera supporting mechanism, and potentiometer means operatively attached to said torque motor; an outer gimbal assembly including a ring means of U-shaped cross-sectional configuration, an axle means operatively mounted on said ring means through a preloaded bearing assembly, said axle means having a portion thereof operatively connected to said ring member of said inner gimbal assembly, a torquer means operatively mounted on said ring means and coaxial with said axle means, said torquer means being connected to said ring member of said inner gimbal assembly, and a potentiometer operatively attached to said torquer means; a plurality of shock mounts, each of said shock mounts being adjustable and including a flexible body portion, rod means attached to and extending through said flexible body portion, and means for adjustably attaching said rod means with said ring means of said outer gimbal assembly, said flexible body portion having means thereon adapted to be attached to a supporting member; and look angle limiter means positioned around said camera supporting mechanism and attached to said ring means of said outer gimbal assembly, said look angle limiter means being constructed so as to allow said camera supporting mechanism to move a predetermined amount with respect to the horizontal plane of said look angle limiter means.

18. In a camera carriage for air vehicles the combination with a main supporting member adapted to be rigidly attached to an airframe of an air vehicle: a first gimbal assembly operatively connected to said supporting member through a plurality of shock mount means, a second gimbal assembly operatively connected to said first gimbal assembly, camera supporting means operatively connected to said second gimbal assembly, and a gyro means operatively mounted on said camera supporting means, said shock mount means including a flexible body having a flanged portion attached to said main supporting member, rod means extending through and connected to said flexible body, and means for adjustably attaching said rod means to said first gimbal assembly.

19. In a camera carriage for air vehicles the combination with a main supporting member adapted to be rigidly attached to an airframe of an air vehicle: a first gimbal assembly operatively connected to said supporting member through a plurality of shock mount means, a second gimbal operatively connected to said first gimbal assembly, camera supporting means operatively connected to said second gimbal assembly, and a gyro means operatively mounted on one end of said camera supporting means and in axial alignment therewith, said gyro means including a motor, a preloaded bearing assembly and rotor means positioned radially outside of and concentric to said motor.

20. In a camera carriage for air vehicles the combination with a main supporting member adapted to be rigidly attached to an airframe of an air vehicle: a first gimbal assembly operatively connected to said supporting member through a plurality of shock mount means, a second gimbal assembly operatively connected to said first gimbal assembly, camera supporting means operatively connected to said second gimbal assembly, gyro means operatively mounted on one end of said camera supporting means and in axial alignment therewith, and means operatively connected to said first gimbal assembly for limiting the movement of said camera supporting means with respect to said main supporting member.

21. A vertically stabilized system capable of maintaining a camera or the like constantly in a perpendicular position irrespective of the ever changing position and speed of the carrier vehicle comprising: a supporting mechanism adapted to support a camera or the like; a gyro assembly, said gyro assembly having a housing fixedly attached to said supporting mechanism, a spin motor operatively attached within said housing, a rotor mounted on said housing through a preloaded bearing assembly, said rotor and bearing assembly being radially located outside of concentric to said spin motor and at the end of said housing opposite said supporting mechanism whereby said spin motor is positioned inwardly toward said supporting mechanism with respect to said rotor to reduce cross-axis inertia; and inner gimbal assembly connected to said supporting mechanism, said inner gimbal assembly having a hollow ring member, an axle means rotatably mounted on said ring member and operatively connected to said supporting mechanism, gimbal torquer means operatively mounted on said ring member and connected to said supporting mechanism, said torquer means being located between said ring member and said supporting mechanism and potentiometer means operatively attached to said torquer means; an outer gimbal assembly, said outer gimbal assembly having a ring means, an axle means rotatably mounted on said ring means and operatively connected to hollow ring member of said inner gimbal assembly, torque motor means operatively mounted on said ring means and operatively connected to said inner gimbal hollow ring member, and potentiometer means operatively attached to said torque motor means; a plurality of adjustable shock mounts for providing optimum vibration isolation and adjustment of the center of gravity of the system, each of said shock mounts including a flexible body portion, rod means extending through and attached to said body portion, means adapted for attaching said body portion to an associated support structure, and means for adjustably attaching said rod means to said ring means of said outer gimbal assembly; a look angle limiter means positioned around said supporting mechanism and operatively connected to said outer gimbal ring means so as to limit the movement of said supporting mechanism a predetermined amount with respect to the horizontal plane of said look angle limiter means; and electrical wiring operatively interconnecting said gyro assembly, inner gimbal assembly and outer gimbal assembly, at least a portion of said wiring being located within said inner gimbal hollow ring member.

References Cited

UNITED STATES PATENTS

| | | | |
|---|---|---|---|
| 2,315,167 | 3/1943 | Von Manteuffel et al. | 74—5.8 X |
| 2,570,653 | 10/1951 | Dillard | 74—5.22 X |
| 2,899,882 | 8/1959 | Wylie et al. | 95—12.5 |
| 2,961,877 | 11/1960 | Edwards | 74—5.22 |
| 3,193,216 | 7/1965 | Fischel | 74—5.8 X |
| 3,060,824 | 10/1962 | Brenner et al. | 95—12.5 |

C. J. HUSAR, *Primary Examiner.*

PALMER W. SULLIVAN, FRED C. MATTERN,
*Examiners.*

J. D. PUFFER, *Assistant Examiner.*